*US006885217B2*

United States Patent
Shinagawa (10) Patent No.: US 6,885,217 B2
(45) Date of Patent: Apr. 26, 2005

(54) DATA TRANSFER CONTROL CIRCUITRY INCLUDING FIFO BUFFERS

(75) Inventor: Noriaki Shinagawa, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 0 days.

(21) Appl. No.: 10/379,799

(22) Filed: Mar. 6, 2003

(65) Prior Publication Data

US 2003/0236931 A1 Dec. 25, 2003

(30) Foreign Application Priority Data

Jun. 20, 2002 (JP) ........................................ 2002-180376

(51) Int. Cl.[7] .......................... G06F 7/38; H03K 19/173; H04L 7/00
(52) U.S. Cl. ........................... 326/38; 370/235; 375/372
(58) Field of Search ........................... 326/38; 370/235, 370/244, 506, 509, 535; 710/49, 63, 48; 711/167; 714/39; 375/372; 365/230.03; 340/825.5

(56) References Cited

U.S. PATENT DOCUMENTS

| | | | | |
|---|---|---|---|---|
| 4,022,979 A | * | 5/1977 | Smith | .......................... 370/244 |
| 4,159,516 A | * | 6/1979 | Henrion et al. | ................ 710/49 |
| 4,910,507 A | * | 3/1990 | Shimizu et al. | ........... 340/825.5 |
| 5,128,939 A | * | 7/1992 | Takatori et al. | .............. 370/509 |
| 5,323,426 A | * | 6/1994 | James et al. | .................. 375/372 |
| 5,331,639 A | * | 7/1994 | Takatori et al. | .............. 370/506 |
| 5,608,866 A | * | 3/1997 | Horikawa | ...................... 714/39 |
| 5,893,925 A | * | 4/1999 | Sawada | ......................... 711/167 |
| 6,055,285 A | * | 4/2000 | Alston | ......................... 375/372 |
| 6,088,284 A | * | 7/2000 | Lee et al. | ............... 365/230.03 |
| 6,111,897 A | * | 8/2000 | Moon | .......................... 370/535 |
| 6,327,249 B1 | * | 12/2001 | Cookman et al. | ............ 370/235 |
| 6,408,351 B1 | * | 6/2002 | Hamdi et al. | .................. 710/63 |

* cited by examiner

Primary Examiner—Patrick Wamsley
(74) Attorney, Agent, or Firm—Rabin & Berdo P.C.

(57) ABSTRACT

Data transfer control circuitry includes a receive buffer for sequentially receiving received data, which are provided from a local processor together with a write control signal to store the data therein, and sequentially developing the stored data in response to a read control signal, which is provided from a host in the same order as stored. A transmit buffer sequentially receives data to be transmitted, which are provided from the host together with another write control signal, and sequentially develops the stored data in response to another read control signal provided from the local processor in the same order as stored. A counter increments a count in response to a clock signal and resets itself in response to either of the write control signals. A clock control circuit interrupts the clock signal when the count reaches a preset value.

12 Claims, 6 Drawing Sheets

DATA TRANSFER CONTROL CIRCUITRY INCLUDING FIFO BUFFERS

BACKGROUND OF THE INVENTION

1. Field of the Invention

The present invention relates to data transfer control circuitry for use in, e.g. a personal computer (PC) card interface (IF), for controlling the transfer of data between a host computer and a local processor.

2. Description of the Background Art

Conventionally, a PHS (Personal Handyphone System) data communication card, for example, regulated in Japan is a peripheral to be inserted in the card receptacle slot of a host computer assigned to a PC card, thereby allowing the host computer to access to the Internet. The PHS card satisfies the PCMCIA (Personal Computer Memory Card International Association) standards. The PCMCIA standards, originally proposed as an interface for semiconductor memory cards, prescribe address and data signal requirements to allow data to be transferred between a host computer and a PC card in the form of parallel signals.

The PHS card includes a memory card interface based on the PCMCIA standards to be received by the card slot of, and connected to, the host computer. The memory card interface decodes an address signal, and transfers data and control signals between the host computer and a UART (Universal Asynchronous Receiver-Transmitter) circuit, which is also included in the PHS card.

The UART circuit is interconnected to a microprocessor functioning as a local processor in the PHS card, and converts parallel data input from the memory card interface on a byte basis to a character-by-character serial signal, adds start and stop sync bits to the leading and tailing ends of a character code signal to transfer the resulting signal at a certain transfer rate. Also, the UART circuit converts a character-by-character signal with start and stop sync bits input thereto in serial from the microprocessor to byte-by-byte parallel signals to deliver the parallel signals to the memory card interface.

The microprocessor also includes a corresponding UART circuit configured to convert the serial signal input from the card interface to parallel signals and parallel signals to be output to the card interface to a serial signal. The PHS communication card additionally includes a radio transmitter-receiver, or duplexer.

When the host computer feeds the PHS data communication card with data to be transmitted, the UART circuit converts the input parallel data to a corresponding serial signal at the transfer rate to deliver the serial signal to the microprocessor. In the microprocessor, the corresponding UART circuit transforms the input serial signal to parallel signals, which are in turn stored in a temporary memory. The parallel signals are ultimately transmitted by the radio duplexer from an antenna on a radio wave.

On the other hand, a radio wave signal caught by the antenna is converted to received data through the radio duplexer to be temporarily stored in the temporary memory by the microprocessor. Subsequently, the UART circuit of the microprocessor converts the received data to a corresponding serial signal at the transfer rate to be transferred to the other UART circuit. The latter UART circuit converts the input serial signal to parallel signals, or received data, and delivers the parallel signals to the host computer via the memory card interface.

The PHS card thus includes the local processor and the memory card interface which are interconnected to each other by the pair of UART circuits. The UART circuits interchange serial data at the transfer rate in time with a clock signal CLK. The host computer can thus transmit and receive data to and from another computer via the PHS telecommunications system at the timing and under the protocol prescribed to the system.

However, the conventional PHS data communication card with the above-stated configuration has the following problem left unsolved. In order to match the data transfer timing between the host and other computers, the pair of UART circuits on the PHS card interchange data therebetween in the form of serial signals. It is therefore necessary between the pair of UART circuits to convert parallel data to be transmitted or received to a serial signal and again convert the serial signal to parallel data. Those two conversion stages make data transfer control circuitry including the UART circuits sophisticated while aggravating power consumption ascribable to the data conversion.

SUMMARY OF THE INVENTION

It is an object of the present invention to provide data transfer control circuitry simpler in arrangement and operation and capable of reducing power consumption.

In accordance with the present invention, data transfer control circuitry for controlling transfer of first data from a first processor to a second processor in time with a clock signal, comprising: a buffer storage for sequentially storing the first data in response to a first write control signal associated with the first processor, and sequentially developing the first data in response to a first read control signal associated with the second processor in a same order as stored; a counter operative in response to the clock signal for incrementing a count, and resetting the count in response to the first write control signal; and a clock control circuit operative in response to said counter for interrupting the clock signal when the count reaches a predetermined value. The predetermined value is set to a value which said counter would not reach when the first data are continuously received by said buffer storage.

Data transfer control circuitry of the present invention includes a first buffer for sequentially receiving first data, which are provided from a first processor together with a first write control signal to store therein the first data, and sequentially developing them in response to a second read control signal, which is provided from a second processor, in the same order as stored. A second buffer sequentially receives second data, which are provided from the second processor together with a second write control signal to store therein the second data, and sequentially develops them in response to a first read control signal provided from the first processor in the same order as stored. A counter increments a count in response to a clock signal and resets itself in response to the first or the second write control signal. A clock control circuit interrupts the clock signal when the count reaches a preset value.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENT

Prior to describing a preferred embodiment of the invention, for the purpose of better understanding of the invention, reference will be made to FIG. 1, which schematically shows a specific configuration of a conventional PHS (Personal Handyphone System) data communication card. The PHS data communication card is a kind of PC (Personal Computer) card to be received by the card receptacle slot of a host computer, not shown, thereby allowing the host computer to make access to the Internet. As shown in the figure, the PHS card includes a connector 1 configured in accordance with the PCMCIA (Personal Computer Memory Card International Association) standards. As described earlier, the PCMCIA standards, originally proposed as an interface for memory cards, prescribe address and data signal requirements to allow data to be transferred between a host computer and a PC card in the form of parallel signals. Since the PC card is exemplary, other types of semiconductor device card, such as a compact flash memory card, are of course applicable.

To the connector 1, connected is a memory card interface 2 also based on the PCMCIA standards. The memory card interface 2 decodes an address signal, a data signal and various control signals received via the connector 1 from the host computer to control various sections included in the card. Also, the memory card interface 2 delivers a data signal and various control signals to the connector 1. The memory card interface 2 is also connected to a UART (Universal Asynchronous Receiver-Transmitter) circuit 3.

The UART circuit 3 converts parallel data input from the memory card interface 2 on a byte basis to a character-by-character serial signal, adds start and stop sync bits to the leading and tailing ends of the serial code signal, and transfers the resulting signal at a certain transfer rate. Also, the UART circuit 3 converts a character-by-character serial signal with start and stop sync bits input thereto to byte-by-byte parallel signals and delivers the parallel signals to the memory card interface 2. The UART circuit 3 has its input and output terminals, which are assigned to the serials signals, respectively connected to an output terminal SO and an input terminal SI of a microprocessor 4.

The microprocessor 4, serving as a local processor for the PHS card, includes another UART circuit 4a configured to convert the serial signal input via the input terminal SI to corresponding parallel signals and parallel signals to a corresponding serial signal to output the serial signal on the output terminal SO.

The PHS communication card additionally includes a clock generator 5 that feeds the UART circuits 3 and 4a with a clock signal CLK defining a timing transmitting and receiving serial signals. The microprocessor 4 is also connected to a RAM (Random Access Memory) 6 for temporarily storing therein data transferred between the UART circuit 3 and the microprocessor 4.

To the microprocessor 4, a transmit/receive control 7 is connected for executing access control, such as the CSMA/CD (Carrier Sense Multiple Access/Collision Detection) scheme, to the PHS system. The transmit/receive control 7 is interconnected to a radio transmitter/receiver, or duplexer 8. The radio duplexer 8 generates a radio signal at a certain frequency band from data to be transmitted, or outgoing data, input from the transmit/receive control 7 and drives an antenna 9 with the radio signal. Also, the radio duplexer 8 detects a radio signal caught by the antenna 9 at a certain frequency band to received, or incoming, data to feeds the transmit/receiver control 7 with the received data.

In operation, the host computer feeds data to be transmitted to the PHS data communication card via the connector 1. The UART circuit 3 converts the input data to a corresponding serial signal at the transfer rate in time with the clock signal CLK and delivers the serial signal to the microprocessor 4. In the microprocessor 4, the UART circuit 4a converts the input serial signal to corresponding parallel signals. The parallel signals so produced are temporarily stored into the RAM 6 and then sent out via the transmit/receive control 7, radio duplexer 8 and antenna 9 in the form of radio signal.

On the other hand, a radio signal coming in through the antenna 9 is received by the radio duplexer 8. The received data are then temporarily stored into the RAM 6 via the transmit/receive control 7 and microprocessor 4. Subsequently, the UART circuit 4a of the microprocessor 4 converts the received data to a corresponding serial signal at the transfer rate and feeds the serial signal to the UART circuit 3. The UART circuit 3 in turn converts the input serial signal to corresponding parallel signals, or received data, and delivers the resultant parallel signals to the host computer via the memory card interface 2 and connector 1.

In the manner stated above, the UART circuit 3 and the UART circuit 4a of the microprocessor 4 transmit serial data therebetween at the transfer rate in time with the clock signal CLK. The host computer can thus transmit and receive data to and from another, remote computer via the PHS system at the timing under the protocol prescribed.

The conventional PHS data communication card with the above-stated configuration has, however, the problem left unsolved, which is discussed earlier. Specifically, the UART circuits 3 and 4a transfer, in order to match the data transfer timing therebetween, signals in a serial form. It is therefore necessary to convert parallel data to be transmitted or received to a serial signal and again convert the serial signal to parallel data. Those two conversion stages make data transfer control circuitry including the UART circuits 3 and 4a too sophisticated while aggravating power consumption ascribable to the data conversion.

Figure 1:
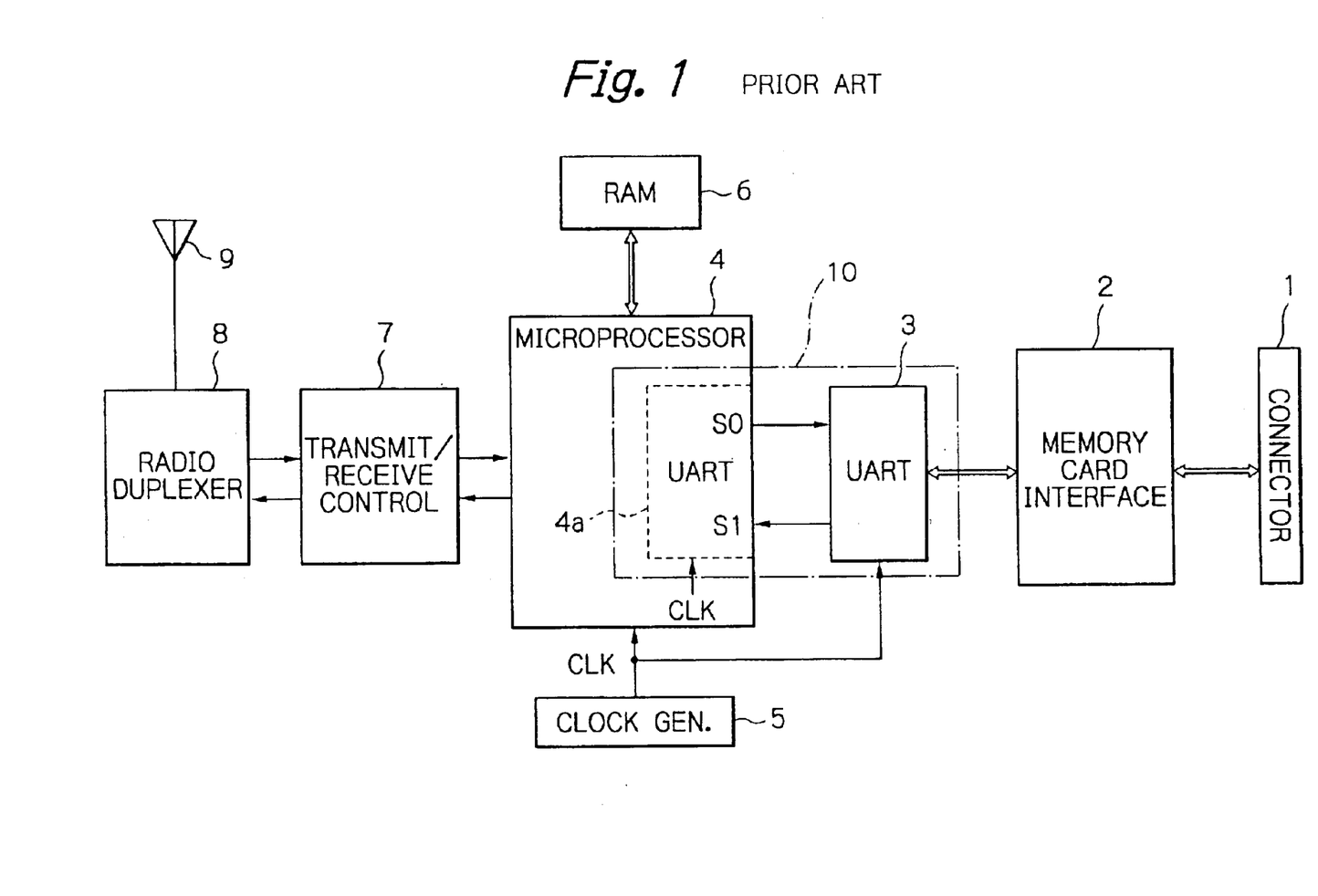
FIG. 1 is a schematic block diagram showing a specific, conventional PHS data communication card.
Figure 2:
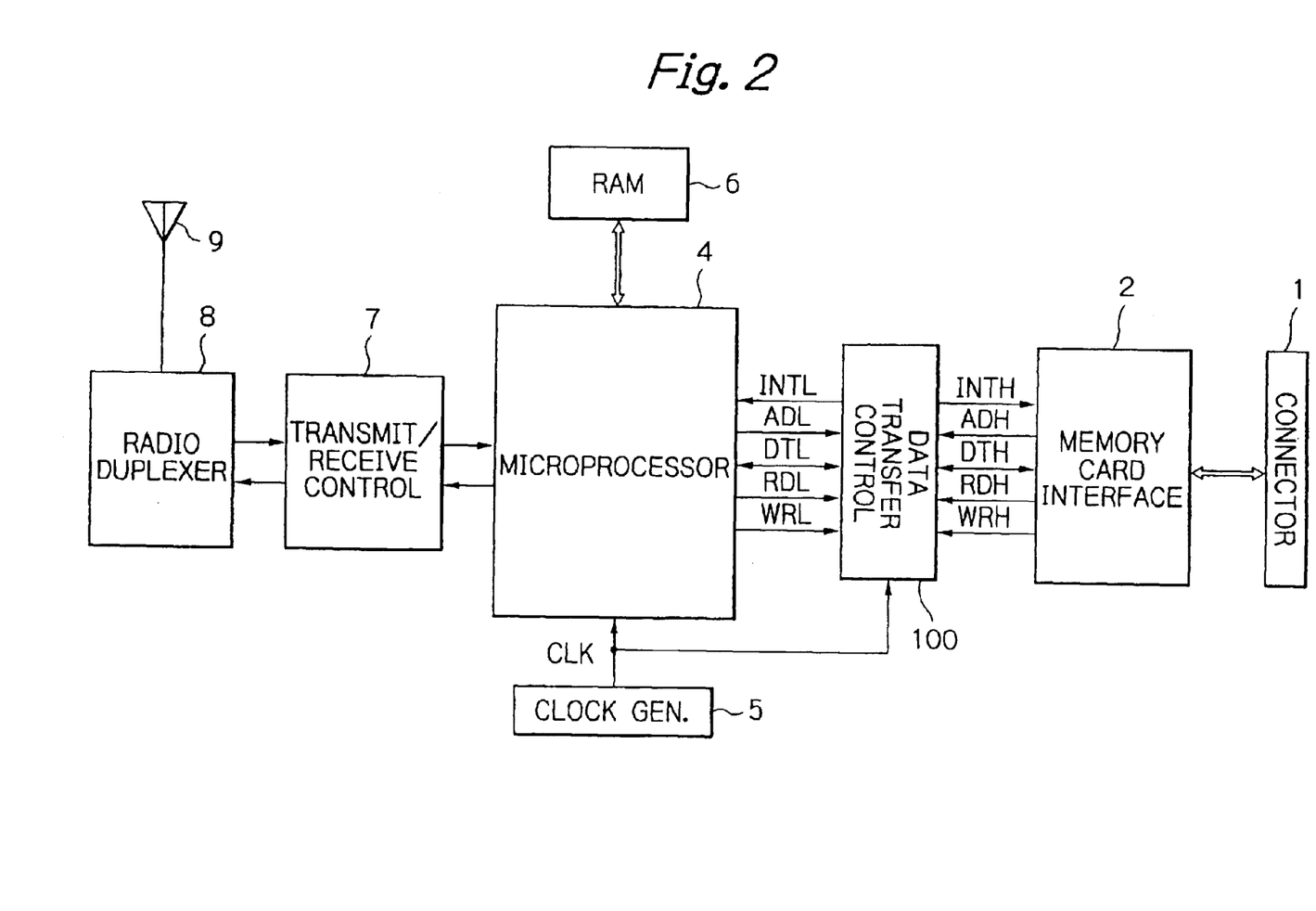
FIG. 2 is a schematic block diagram, similar to FIG. 1, showing a specific PHS data communication card to which data transfer control circuitry is applied in accordance with the present invention.

Referring now to FIG. 2, the illustrative embodiment of data transfer control circuitry 100 in accordance with the invention maybe substituted for, e.g. the data transfer control circuitry, enclosed by a dash-and-dot line 10 in FIG. 1, of the conventional PHS data communication card. In the figures, like components are designated with the same reference numerals. More in detail, with reference to FIG. 3, the illustrative embodiment of the data transfer control circuitry 100 includes a host control interface 11, a local control interface 12, a transmit buffer 13 and a receive buffer 14 interconnected as shown. The host control interface 11 is to be connected to a host machine, e.g. a host computer by the PC card receptacle slot thereof, not shown. The local control interface 12 is interconnected to a local processor, such as the microprocessor 4 of the PHS card. The transmit and receive buffers 13 and 14 each are implemented as a FIFO (First-In First-Out) type of storage device.

Figure 3:
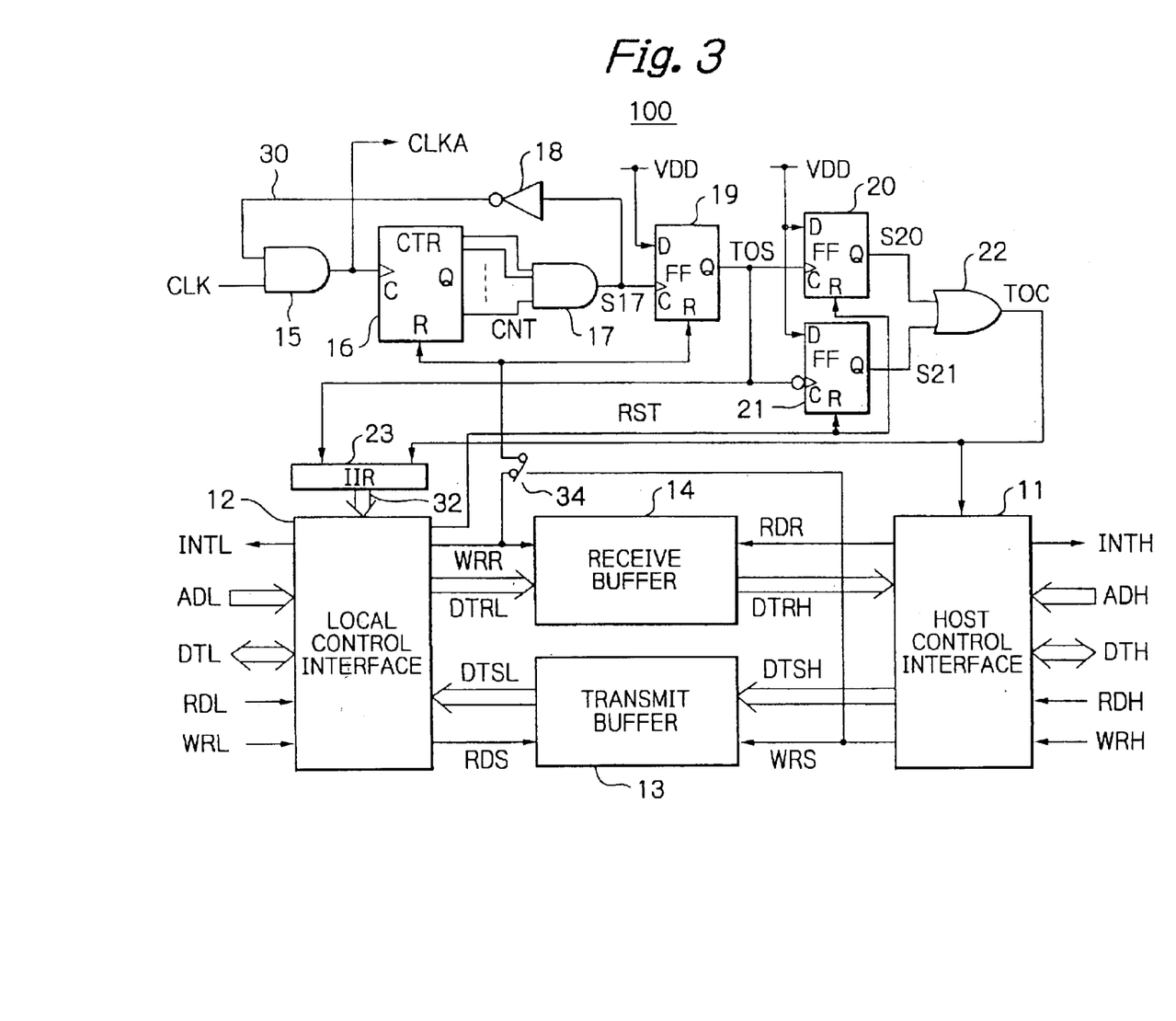
FIG. 3 is a preferred embodiment of the schematic block diagram showing data transfer control circuitry in accordance with the present invention.

The host control interface 11 is adapted to transmit and receive parallel data signals DTH to and from the host. Further, the host interface 11 is adapted to receive an address signal ADH, a read control signal RDH and a write control signal WRH from the host and transfer an interrupt signal INTH to the host. In addition, the host control interface 11 feeds the transmit buffer 13 with a write control signal WRS for thereby writing in parallel transmit data DTSH to the transmit buffer 13, and the receive buffer 14 with a read control signal RDR for thereby reading out parallel data DTRH from the receive buffer 14.

The local control interface 12 is adapted for transmitting and receiving parallel data signals DTL to and from the local processor. Further, the local control interface 12 is adapted to receive an address signal ADL, a read control signal RDL and a write control signal WRL from the local processor, and send out an interrupt signal INTL to the local processor. In addition, the local control interface 12 feeds a write control signal WRR to the receive buffer 14 for thereby writing in parallel received data DTRL to the receive buffer 14, and a read control signal RDS to the transmit buffer 13 for thereby reading out parallel data DTSL from the transmit buffer 14.

A clock signal CLK, which may be generated by the clock generator 5, FIG. 1, is applied to one input of a two-input AND gate 15. The AND gate 15 has its output port developing another clock signal CLKA, which is resultant from AND operation made by the AND gate 15 with a signal 30, described later. The latter clock signal CLKA is fed to a clock terminal C of a counter (CTR) 16, and also to a transmit character time-out counter, a transmit trigger-level counter, a receive time-out counter and other control circuits, which are possibly included in the data transfer control circuitry 100, although not shown specifically, of the PHS card.

The counter 16 is adapted to be responsive to each positive-going edge of the clock signal CLKA to increment its count CNT by 1 (one) to develop the count on its output terminals Q. The counter 16 has its reset terminal R, which is fed with a write control signal WRR through a transfer switch 34 by the local control interface 12. When the write control signal WRR goes high, the counter 16 resets the count CNT to its initial state, zero, in the embodiment. The switch 34 is adapted to selectively connect the reset terminals R of the counter 16 and the flip-flop 19 to either the write control signal WRR or WRS.

The illustrative embodiment is thus adapted to include the switch 34 to selectively connect the write control signals WRR and WRS to the reset terminals R, merely for simplicity. In an application where another set of circuits substantially identical with the circuitry comprising the circuit elements 15 through 22 is additionally provided for the transmit buffer 13, the switch 34 may be omitted, and instead the write control signal WRR is directly interconnected from the local control interface 12 to the reset terminals R of the counter 16 and the flip-flop 19 while the other write control signal WRS is interconnected from the host control interface 11 to the reset terminals of the components in the other set of circuits corresponding to the counter 16 and the flip-flop 19.

The count CNT of the counter 16 is input in the form of parallel bits to a coincidence detector 17 implemented by, e.g. an AND gate, as illustrated. The coincidence detector 17 is adapted to produce an output signal S17. More specifically, the output ports Q, representative of the count CNT, are connected to the corresponding input ports of the AND gate 17 in such a manner that, when the count CNT reaches a preset value VAL, the AND gate, or coincidence detector, 17 makes its output S17 high. The connections between the counter 16 and the AND gate 17 function as a sort of decoder. The preset value VAL, thus established by the connection of the counter 16 to the coincidence detector 17, is selected to be greater than a count CNT that could be attained in an period of time over which the received data DTRL are expected to be continuously written into the receive buffer 14. The coincidence detector 17 has its output S17 connected to another input 30 of the AND gate 15 via an inverter 18 as well as to a clock terminal C of a D type flip-flop (FF) 19.

The flip-flop 19 additionally has its data terminal D connected to a power supply VDD providing a high level, its reset terminal R receiving the write control signal WRR like the counter 16, and its output terminal Q on which a time-out signal TOS appears. The time-out signal TOS is fed to clock terminals C of flip-flops 20 and 21. The flip-flops 20 and 21 have data terminals D thereof also connected in common to the power supply VDD.

The flip-flop 20 is adapted to latch, when the time-out signal TOS goes high, a signal appearing on its data terminal D and output the latched signal on its output terminal Q. The other flip-flop 21 is adapted for latching a signal appearing on its data terminal D when the time-out signal TOS goes low, while outputting the latched signal on its output terminal Q. The local control interface 12 feeds a reset signal RST to both of the reset terminals R of the flip-flops 20 and 21. The output terminals Q of the flip-flops 20 and 21 are connected to respective input terminals of a two-input OR gate 22. The OR gate 22 is adapted to produce a time-out state shift signal TOC on its output terminal.

Figure 5:
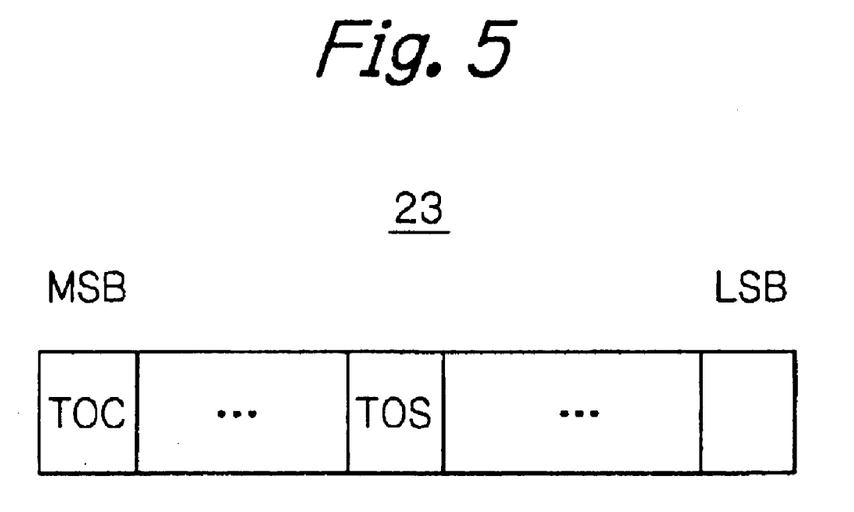
FIG. 5 schematically shows the storage field of the interrupt identification (ID) register shown in FIG. 3.

The time-out signal TOS and time-out state shift signal TOC are connected to an interrupt ID (identification) register (IIR) 23, FIG. 5, which has an output 32 connected to the local control interface 12. The local control interface 12 is adapted to output the previously mentioned reset signal RST in accordance with the contents of the interrupt ID register 23. Further, the time-out state shift signal TOC is also connected to the host control interface 11, so that the host control interface 11 outputs the previously mentioned interrupt signal INTH in response to the time-out state shift signal TOC.

Figure 4:
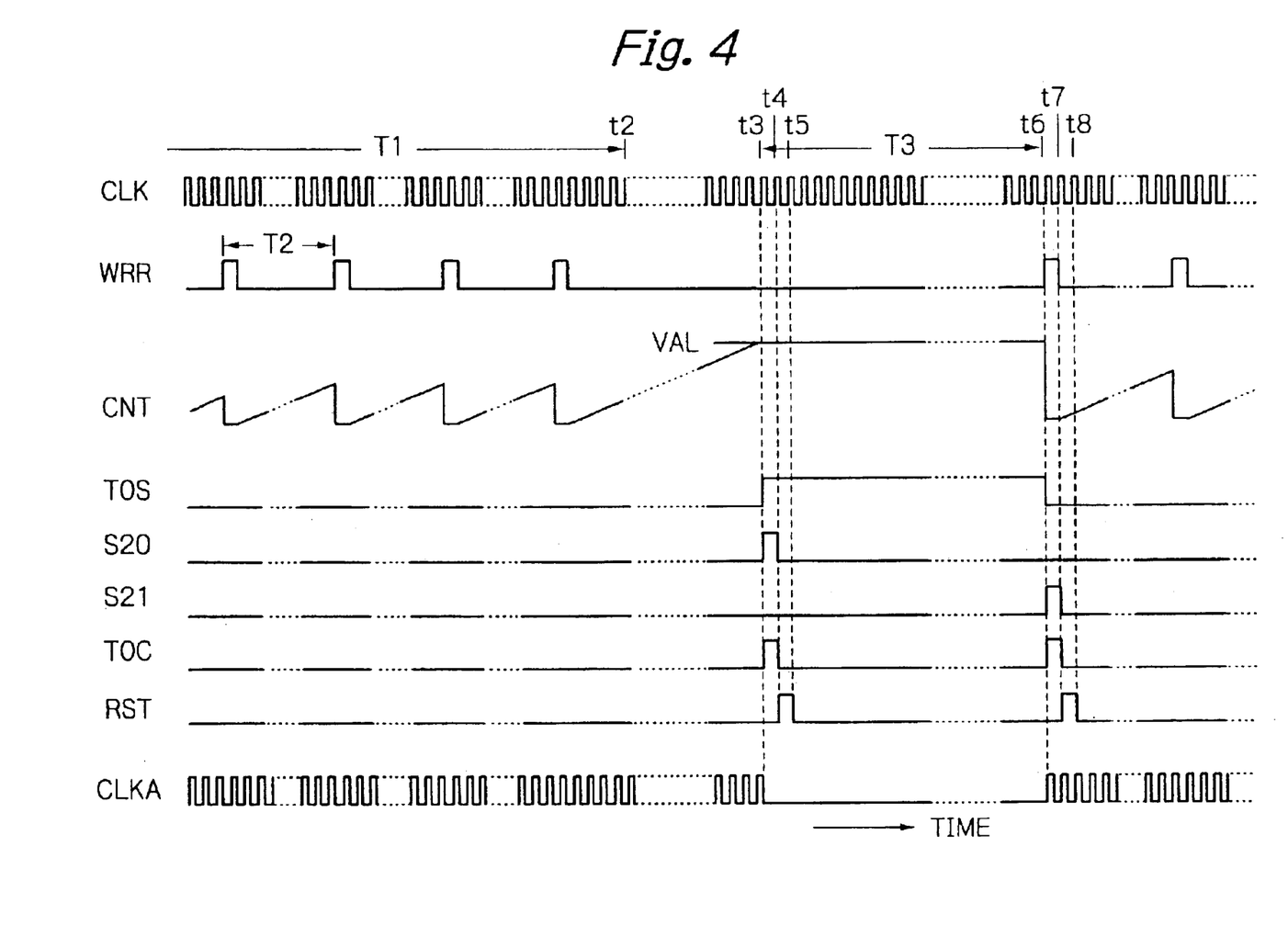
FIG. 4 plots signal waveforms useful for understanding a specific, receiving operation of the circuitry shown in FIG. 3.

A specific operation of the illustrative embodiment will be described with reference to FIG. 4. In a receiving operation, the switch 34 connects the write control signal WRR from the local control interface 12 to the reset terminals R of the counter 16 and the flip-flop 19, as shown in FIG. 3. When the local control interface 12 continuously receives received data DTL together with the write control signal WRL and the address signal ADL over an interval T1 between times t1 and t2, for example, it periodically produces the write control signal WRR to the receive buffer 14 at the predetermined time intervals T2. In response, the counter 16 is repeatedly reset at the predetermined period T2. The count CNT is therefore reset before reaching the preset value VAL defined by the coincidence detector 17. Consequently, the output signal S17 of the coincidence detector 17 and time-out signal TOS output from the flip-flop 19 remain at the low level thereof over the interval T1.

In the period of time T1, the receive buffer 14 consecutively receives receive data DTRL through the local control interface 12 in time with the write control signal WRR to store them therein while it develops the stored data DTRH therefrom in response to the read control signal RDR to the host control interface 11. In the similar manner in the period of time T1, the transmit buffer 13 consecutively receives data DTSH to be transmitted through the host control interface 11 in synchronism with the write control signal WRS to store them therein while it develops the stored data DTSL therefrom in response to the read control signal RDS to the local control interface 12.

At the time t2, in the instant example, the local control interface 12 fails to continuously receive received data DTL together with the write control signal WRL and the address signal ADL. Then, the local control interface 12 stops writing in data to the receive buffer 14 and stops the write control signal WRR. The counter 16 still continuously increments its count CNT in response to the clock signal CLKA without being reset. At a time t3 following thereto, the count CNT reaches the preset value VAL defined by the coincidence detector 17 with the result that the signal S17 goes high and causes the time-out signal TOS to go high. The AND gate 15 is in turn closed or disabled to cease the clock signal CLKA, i.e. maintaining the clock signal output CLKA at its low level.

The time-out signal TOS gone high at the time t3 causes the signal S20 output from the flip-flop 20 to go high also, so that the time-out state shift signal TOC goes high. The time-out signal TOS and time-out state shift signal TOC are stored into the interrupt ID register 23.

At a time t4, the local control interface 12 reads out the contents of the interrupt ID register 23 and renders the reset signal RST high accordingly. The reset signal RST in turn resets the flip-flop 20 to render the signal S20 and hence the time-out state shift signal TOC low again. Subsequently, at a time t5 following thereto, the local control interface 12 again makes the reset signal RST low in accordance with the contents of the interrupt ID register 23. Still at this instant, the counter 16 has its count CNT remain at the preset value VAL, so that the time-out signal TOS remains at its high level.

At a time t6, in the example, the local control interface 12 starts continuously receiving received data DTL together with the write control signal WRL and the address signal ADL, and periodically producing the write control signal WRR to the receive buffer 14 at the predetermined time intervals T2. This means that over the interval T3 between times t3 and t6, the clock signal CLKA has been interrupted, and the local control interface 12 again starts writing in received data DTRL to the receive buffer 14. At this time, the local control interface 12 issues the write control signal WRR, which in turn resets the counter 16 to its initial state, i.e. the count CNT being null, and the flip-flop 19, so that the time-out signal TOS and signal S17 both go low. Consequently, the AND gate 15 is opened or enabled and again starts developing the clock signal CLKA. The time-out signal TOS so gone low causes the output signal S21 of the flip-flop 21 to go high with the result that the time-out state shift signal TOC goes high. Again, the time-out signal TOS and time-out state shift signal TOC will be stored into the interrupt ID register 23.

At a time t7, the local control interface 12 reads out the contents of the interrupt ID register 23 and renders the reset signal RST high accordingly. The reset signal RST in turn resets the flip-flop 21 with the result that the signal S21 and time-out state shift signal TOC again go low. Subsequently, at a time t8, the local control interface 12 again makes the reset signal RST low in accordance with the contents of the interrupt ID register 23. The operation will then proceed in the same fashion as in the period of time T1 described earlier.

Figure 6:
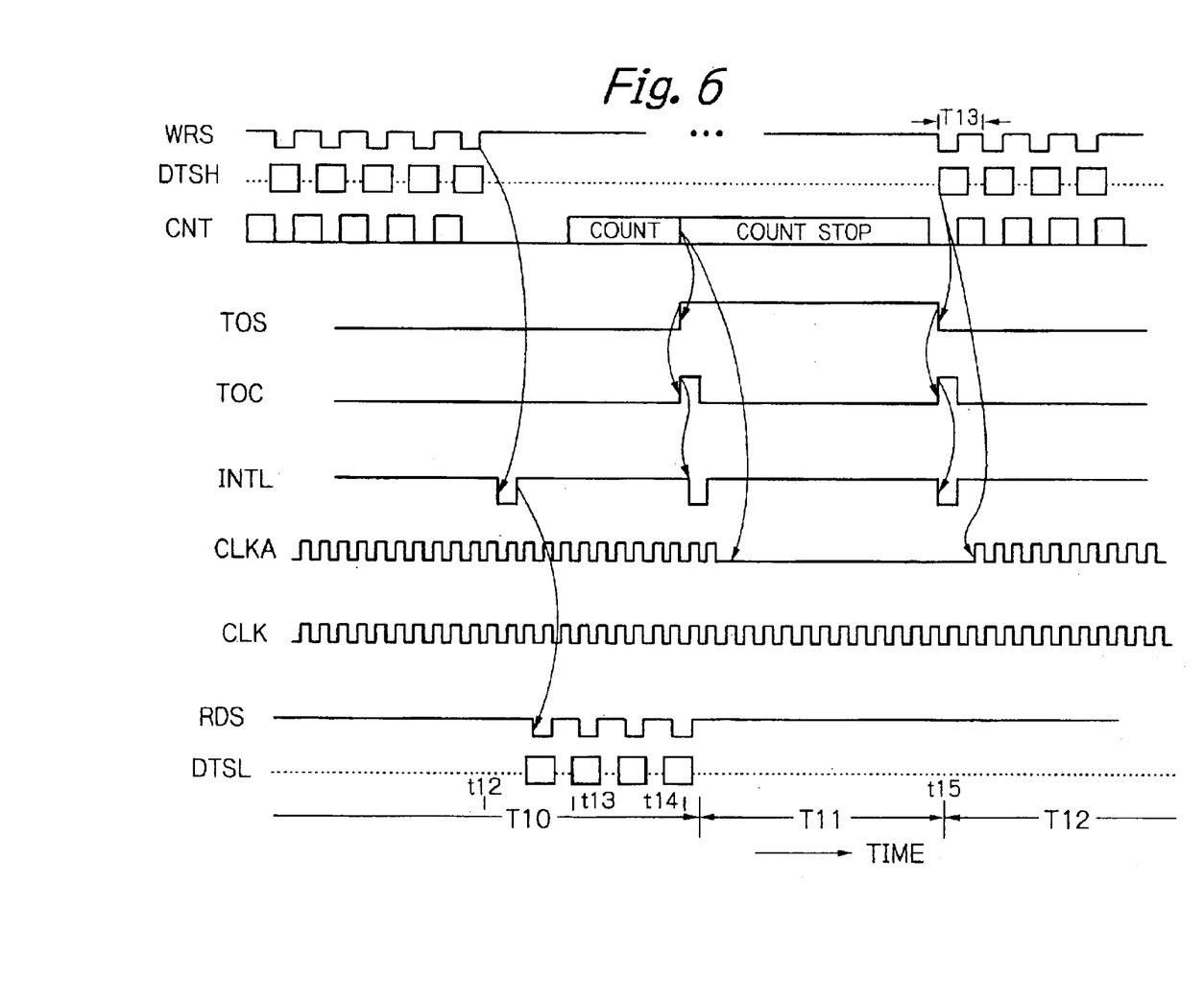
FIG. 6 plots, similarly to FIG. 4, signal waveforms useful for understanding a specific, transmitting operation of the circuitry shown in FIG. 3.

Referring now to FIG. 6, in the period of time T10, the transmit buffer 13 consecutively receives data DTSH to be transmitted through the host control interface 11 in synchronism with the write control signal WRS and stores them therein while it develops the stored data DTSL therefrom to the local control interface 12 in response to the read control signal RDS. It is to be noted that in a transmitting mode of operation the switch 34 takes its connection state, as opposite to what is shown in FIG. 3, to connect the write control signal WRS from the host control interface 11 to the reset terminals R of the counter 16 and the flip-flop 19.

At the time t12, in the instant example, the host completes the writing of data to be transmitted in the transmit buffer 13, and in response an interrupt signal INTL is produced from the local control interface 12 to notify the microprocessor 4 of the completion of the data storage in the transmit buffer 13. The microprocessor 4 in turn provides the local control interface 12 with a local read signal RDL, which enables the stored data DTSL to be read out from the transmit buffer 13 so as to ultimately be transmitted from the antenna 9.

At the time point t13, in this example, the counter 16 restarts counting. Since then, as depicted in FIG. 6, the host control interface 11 fails to continuously receive data DTH to be transmitted together with the write control signal WRH and the address signal ADH. The host control interface 11 still stops writing in data to the transmit buffer 13 and the write control signal WRS. The counter 16 then continuously increments its count CNT in response to the clock signal CLKA without being reset. At a time t14 following thereto, the count CNT reaches the predetermined value VAL defined by the coincidence detector 17 with the result that the signal S17 goes high and causes the time-out signal TOS and the time-out state shift signal TOC to go high. The AND gate 15 is in turn closed or disabled to cease the clock signal CLKA, i.e. maintaining the clock signal output CLKA at its low level. In response to the time-out state shift signal TOS, the local control interface 12 produces an interrupt signal INTL.

At the time t15, the host control interface 11 starts continuously receiving data DTH to be transmitted together with the write control signal WRH and the address signal ADH from the host, and periodically producing the write control signal WRS to the transmit buffer 13 at a predetermined time intervals T13. This means that over the interval T15 between times t14 and t15, the clock signal CLKA has been interrupted, and the host control interface 11 again starts writing in data DTRH to be transmitted to the transmit buffer 13. At this time, the host control interface 11 issues the write control signal WRS, which in turn resets the counter 16 to its initial state, i.e. the count CNT being null, and the flip-flop 19, so that the time-out signal TOS and signal S17 both go low. Consequently, the AND gate 15 is opened or enabled and again starts developing the clock signal CLKA. The time-out signal TOS so gone low causes the output signal S21 of the flip-flop 21 to go high with the result that the time-out state shift signal TOC goes high. Again, the time-out signal TOS and time-out state shift signal TOC will be stored into the interrupt ID register 23. The data transmission sequence has thus been restored, as shown in the period T12 in FIG. 6.

As described above, in the illustrative embodiment, the transmit and receive buffers 13 and 14, adapted for adjusting the transfer timing of the data DTSH to be sent out and that of the received data DTRL, respectively, are both implemented in the form of FIFO storage devices. The illustrative embodiment therefore need not use the UART circuitry requiring the conventional serial/parallel conversion consecutively effected twice, but is therefore simpler in circuit arrangement. Further, the AND gate 15, counter 16 and coincidence detector 17 constitute a clock control circuit that is adapted to stop feeding, when received data DTRL are interrupted, the control circuits included in the data transfer control circuitry 100 with the clock signal CLKA driving those circuits, thereby advantageously reducing power consumption.

While the illustrative embodiment uses the write control signal WRR as a rest signal for resetting the counter 16, the reset signal may alternatively be implemented by the write control signal WRS output from the host control interface 11, depending on the system to which the illustrative embodiment is applied. Also, the circuit configured to reset the counter 16 for clock control with the write control signal WRR may be replaced with a circuit configured to reset a counter for clock control with the write control signal WRS output from the host control interface 11, depending on the system to which the illustrative embodiment is applied.

Further, the circuit is only illustrative which is implemented by the AND gate 15, counter 16 and coincidence detector 17 to stop outputting the clock signal CLKA when the count CNT reaches the preset value VAL. This is also true with the circuit configured to generate the time-out status signal TOS and time-out status shift signal TOC.

In summary, it will be seen that the present invention provides data transfer control circuitry simpler in construction and operation, and capable of reducing power consumption.

The entire disclosure of Japanese patent application No. 2002-180376 filed on Jun. 20, 2002, including the specification, claims, accompanying drawings and abstract of the disclosure is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. Data transfer control circuitry for controlling transfer of first data from a first processor to a second processor in time with a clock signal, comprising:
   a buffer storage for sequentially storing the first data in response to a first write control signal associated with the first processor, and sequentially developing the first data in response to a first read control signal associated with the second processor in a same order as stored;
   a counter operative in response to the clock signal for incrementing a count, and resetting the count in response to the first write control signal; and
   a clock control circuit operative in response to said counter for interrupting the clock signal when the count reaches a predetermined value.

2. The circuitry in accordance with claim 1, wherein the predetermined value is set to a value which said counter would not reach when the first data are continuously received by said buffer storage.

3. The circuitry in accordance with claim 1, further comprising a first interface control circuit for generating the first write control signal from a timing control signal received from the first processor.

4. The circuitry in accordance with claim 1, further comprising a second interface control circuit for generating the first read control signal from a timing control signal received from the second processor.

5. The circuitry in accordance with claim 1, further comprising an additional buffer storage for sequentially storing second data in response to a second write control signal associated with the second processor, and sequentially developing the second data in response to a second read control signal associated with the first processor in a same order as stored, whereby the second data are transferred from the second processor to the first processor in time with the clock signal.

6. A data transfer circuit comprising a first processor for transferring first data to a second processor in time with a clock signal, and data transfer control circuitry for controlling transfer of the first data from the first processor to the second processor, said control circuitry comprising:
   a buffer storage for sequentially storing the first data in response to a first write control signal associated with the first processor, and sequentially developing the first data in response to a first read control signal associated with the second processor in a same order as stored;
   a counter operative in response to the clock signal for incrementing a count, and resetting the count in response to the first write control signal; and
   a clock control circuit operative in response to said counter for interrupting the clock signal when the count reaches a predetermined value.

7. The data transfer circuit in accordance with claim 6, wherein said first processor produces a second read control signal when said first processor receives second data, said control circuitry further comprising an additional buffer storage for sequentially storing the second data in response to a second write control signal associated with the second processor, and sequentially developing the second data in response to the second read control signal in a same order as stored, whereby the second data are transferred from the second processor to said first processor in time with the clock signal.

8. The data transfer circuit in accordance with claim 7, wherein said data transfer circuit is in a form of PC (Personal Computer) card connectable to the second processor.

9. The data transfer circuit in accordance with claim 8, wherein said PC card is a PHS (Personal Handyphone System) card connectable to the second processor.

10. The data transfer circuit in accordance with claim 6, wherein the predetermined value is set to a value which said counter would not reach when the first data are continuously received by said buffer storage.

11. The data transfer circuit in accordance with claim 6, wherein said first processor generating a timing control signal together with the first data, said control circuitry further comprising a first interface control circuit for generating the first write control signal from the timing control signal.

12. The data transfer circuit in accordance with claim 6, further comprising a second interface control circuit for generating the first read control signal from a timing control signal received from the second processor.

* * * * *